US012266086B2

(12) United States Patent
Kettenis

(10) Patent No.: US 12,266,086 B2
(45) Date of Patent: Apr. 1, 2025

(54) MOSQUITO NOISE FILTERING

(71) Applicant: V-Silicon Semiconductor (Hefei) Co., Ltd, Hefei (CN)

(72) Inventor: Jeroen Maria Kettenis, Geldern (DE)

(73) Assignee: V-Silicon Semiconductor (Hefei) Co., Ltd, Hefei (CN)

( * ) Notice: Subject to any disclaimer, the term of this patent is extended or adjusted under 35 U.S.C. 154(b) by 477 days.

(21) Appl. No.: 17/677,992

(22) Filed: Feb. 22, 2022

(65) Prior Publication Data
US 2023/0267573 A1  Aug. 24, 2023

(51) Int. Cl.
G06T 5/70 (2024.01)
G06T 5/20 (2006.01)
G06T 5/40 (2006.01)
G06T 7/13 (2017.01)

(52) U.S. Cl.
CPC .......... *G06T 5/70* (2024.01); *G06T 5/20* (2013.01); *G06T 5/40* (2013.01); *G06T 7/13* (2017.01); *G06T 2207/20028* (2013.01); *G06T 2207/20192* (2013.01)

(58) Field of Classification Search
CPC .... G06T 5/70; G06T 5/20; G06T 5/40; G06T 7/13; G06T 2207/20028; G06T 2207/20192; G06T 5/94; H04N 19/86; H04N 19/117; H04N 19/182; H04N 19/42
See application file for complete search history.

(56) References Cited

U.S. PATENT DOCUMENTS

| | | | | |
|---|---|---|---|---|
| 2009/0060370 A1* | 3/2009 | Pedersen | ................... | G06T 5/40 382/264 |
| 2009/0080798 A1* | 3/2009 | Maurer | ................ | H04N 19/176 382/275 |
| 2012/0057803 A1* | 3/2012 | Wakazono | ................ | G06T 5/70 382/274 |
| 2019/0057491 A1* | 2/2019 | Yang | ........................ | G06T 5/77 |

OTHER PUBLICATIONS

Abbas, H., et al., "Suppression of Mosquito Noise by Recursive Epsilon-Filters", ICASSP 2007, (2007), 4 pgs.
Xiao, B., et al., "Reduction of mosquito noise based on the adaptive bilateral-filter", 12th International Conference on Natural Computation, Fuzzy Systems and Knowledge Discovery (ICNC-FSKD), Changsha, 2016, doi: 10.1109/FSKD.2016.7603475, (2016), 1933-1939.

* cited by examiner

*Primary Examiner* — Siamak Harandi
*Assistant Examiner* — Mehrazul Islam
(74) *Attorney, Agent, or Firm* — Schwegman Lundberg & Woessner, P.A.

(57) ABSTRACT

In one aspect, a method to reduce compression artefacts, includes generating a first set of weights based on pixel value differences, producing a soft binned histogram from values in a neighborhood of pixels, generating an adapted histogram from the soft binned histogram using interpolation, generating occurrence density weights from the adapted histogram, combining the first set of weights and the occurrence density weights, filtering pixel values a bilateral filter using the combined weights, mixing the filtered pixel values and original pixel values, and outputting the mix of filtered pixel values and original pixel values.

15 Claims, 9 Drawing Sheets

MOSQUITO NOISE FILTERING

BACKGROUND

Mosquito and ringing artefacts can be regarded as deviations from a certain average level that is found in the neighborhood of strong pixel value variations, such as edges within an image. These artefacts are regarded as both very annoying to a viewer and not easily reduced.

BRIEF SUMMARY

In one aspect, a method to reduce compression artefacts includes generating a first set of weights based on pixel value differences, producing a soft binned histogram from values in a neighborhood of pixels, generating an adapted histogram from the soft binned histogram using interpolation, generating occurrence density weights from the adapted histogram, combining the first set of weights and the occurrence density weights, filtering pixel values a bilateral filter using the combined weights, mixing the filtered pixel values and original pixel values, and outputting the mix of filtered pixel values and original pixel values.

In another aspect, a method to reduce compression artefacts includes producing a soft binned histogram from values in a neighborhood of pixels, generating an adapted histogram from the soft binned histogram using interpolation, generating occurrence density weights from the adapted histogram, generating occurrence density mix control based on the weights, generating closest central pixel levels based on the occurrence density mix control, mixing the pixels using the occurrence density mix control and closest central pixel levels, and outputting the mixed pixels.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
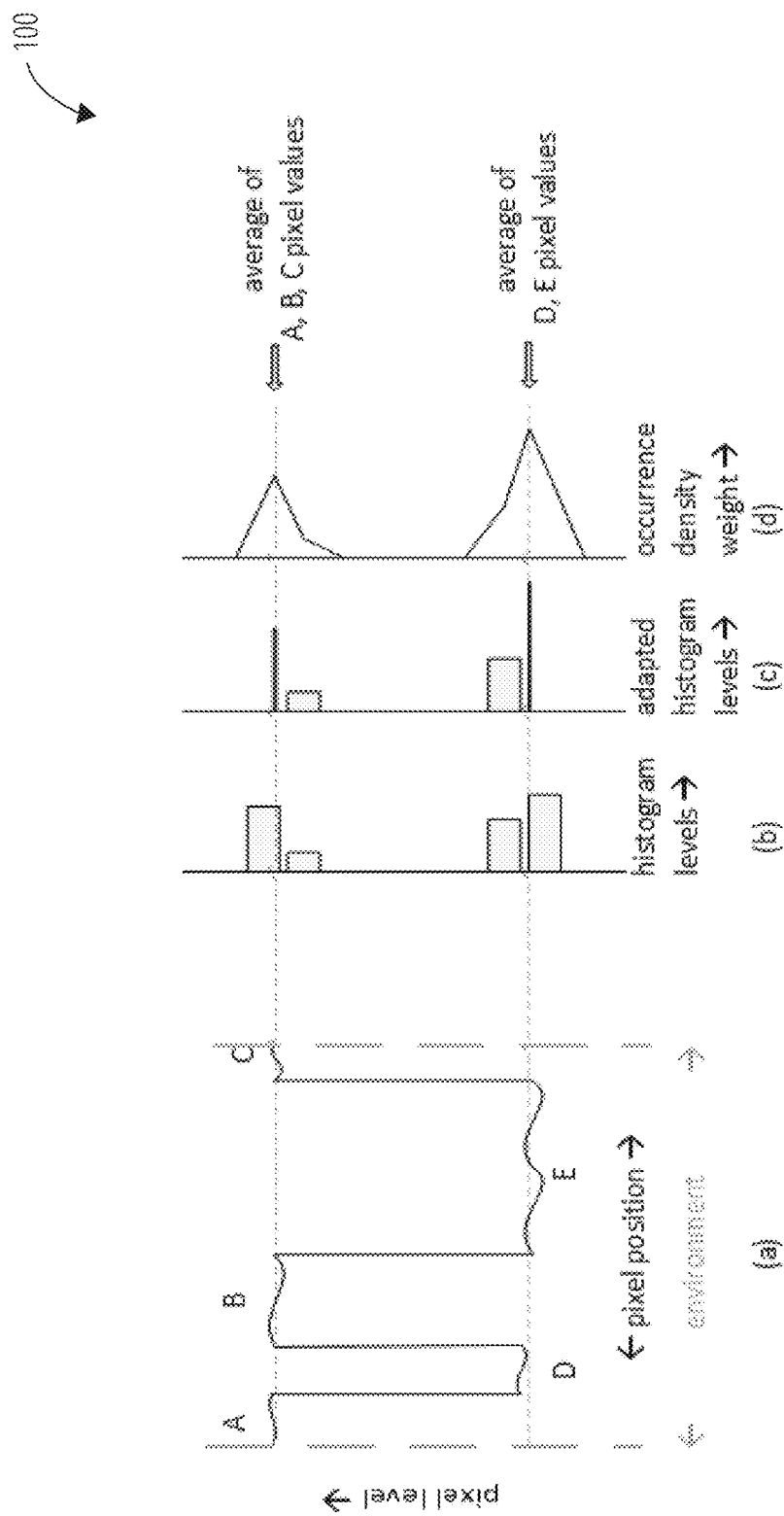
FIG. 1 illustrates signal behavior of an embodiment.

Embodiments enable a mosquito and ringing filtering in a 'first pixel neighborhood' of any high-variance occurrence, where a (same or an alternative) 'second pixel neighborhood' is furthermore characterized by having a significant fraction of pixels with values similar to that of the central pixel. Simply said, the filtering flattens assumed constant pixel-level areas, when in the neighborhood there is a significant variance, such as from an edge with substantial amplitude.

To reduce artefacts that are induced by a high-variance occurrence in a compression block the above 'first pixel neighborhood' covers the whole block in which the high variance occurs.

Thus, in case the effective compression block size and position is well-known, the above 'first pixel neighborhood' may equal the set of pixels resulting from the compression block.

Otherwise, the above 'first pixel neighborhood' can equal double the maximum compression block-size in both height and width that is expected from compressions upstream the image/video data path. With that dimensioning, any artefacts from a high-variance occurrence within a block will be captured in the mosquito/ringing filter.

In an embodiment a spatial bilateral-filter can be used. The bilateral filter uses a weight based on pixel value differences (central pixel value versus respective neighbor pixel value) and, further, weight from histogram-density at the value of the respective neighbor pixel, instead of a weight from the spatial distance.

The occurrence-density at a certain level is retrieved from a generated histogram over the 'second pixel neighborhood', typically centered on the current pixel. The histogram needs to provide a decent value-resolution, to prevent quantization effects. Instead of using a histogram with nearly as many bins as present in the value range (such as 128 up to 1024 bins), it is also possible to use 'soft-binning' with much less bins (such as using 32 or 64 bins). This 'soft-binning' means that:

At the histogram building, a source level gives a contribution to the two (or more) nearest-fitting bins, where the contribution is e.g. linearly distributed to the level of fitting to each bin, in that the bin that is closest with its center to the source level gets the highest contribution.

At the occurrence-density retrieval, an interpolation is done after a modification of the histogram:

On a bin that has a higher level than its left neighbor bin, a value equaling the sum of the bin-level and its left neighbor bin-level are assigned at a position that matches the weighted average position of the left and current bin.

On a bin that has an equal or higher level than its right neighbor bin, the same procedure is carried out, to form a value in between the current and right bin.

The original value at the center of the bin is left out, if the current bin is equal or larger than either the left or right bin. Other bins remain original.

A linear (or higher order) interpolation is done from the above adapted histogram.

FIG. 1 illustrates signal behavior 100 of an embodiment. On the left part (a) a cross-section is shown of input pixel values in a block (assumed is that the signal levels in the actual 2-dimensional environment have the same distribution as this cross-section). On the right parts (b) and (c), the related histogram data and the adapted histogram are shown. The part (d) shows the occurrence density weight level, derived from the adapted histogram, by using a linear interpolation. The horizontal dotted lines represent the average pixel levels of A, B and C, resp. of D and E regions.

The new approach is capable to filter pixels in sections A, B and C with all other pixels therein. Likewise for pixel values in sections D and E.

Bilateral filters that only use value-differences for weighting, will only partially filter the values in section D with the values in E. This will result in a fraction of the mosquito and ringing remaining. Especially the filtered result from section D will not have strong reduction of the artefacts, unless the value-difference weight curve is set rather wide. The latter is undesired in general, as it will generally reduce detail.

Bilateral filters with both value-differences and distances for weighting, will even less filter values in D with values in E, as the distance between those sections is considerable. Thus significant residue of ringing and mosquito will remain in section D.

Using the bilateral filter as disclosed herein, with both value-differences and histogram-densities for weighting: The significant histogram-density around the levels found in D and E (resp. around A, B and C) enables the pixels in section D to strongly average with all the pixels in D and E and thus strongly reduce the mosquito and ringing there.

Accordingly,

The new bilateral filtering is pulling towards an average level of a group of similar-leveled pixels, more strongly than with a commonly used value-weight bilateral filter. This results from the property in the new approach that the occurrence-density-weight gives an extra biasing towards the average.

Furthermore, it is capable to filter also strongly in a confined small area that has similar pixel levels as a larger area elsewhere in the wide area.

Figure 2:
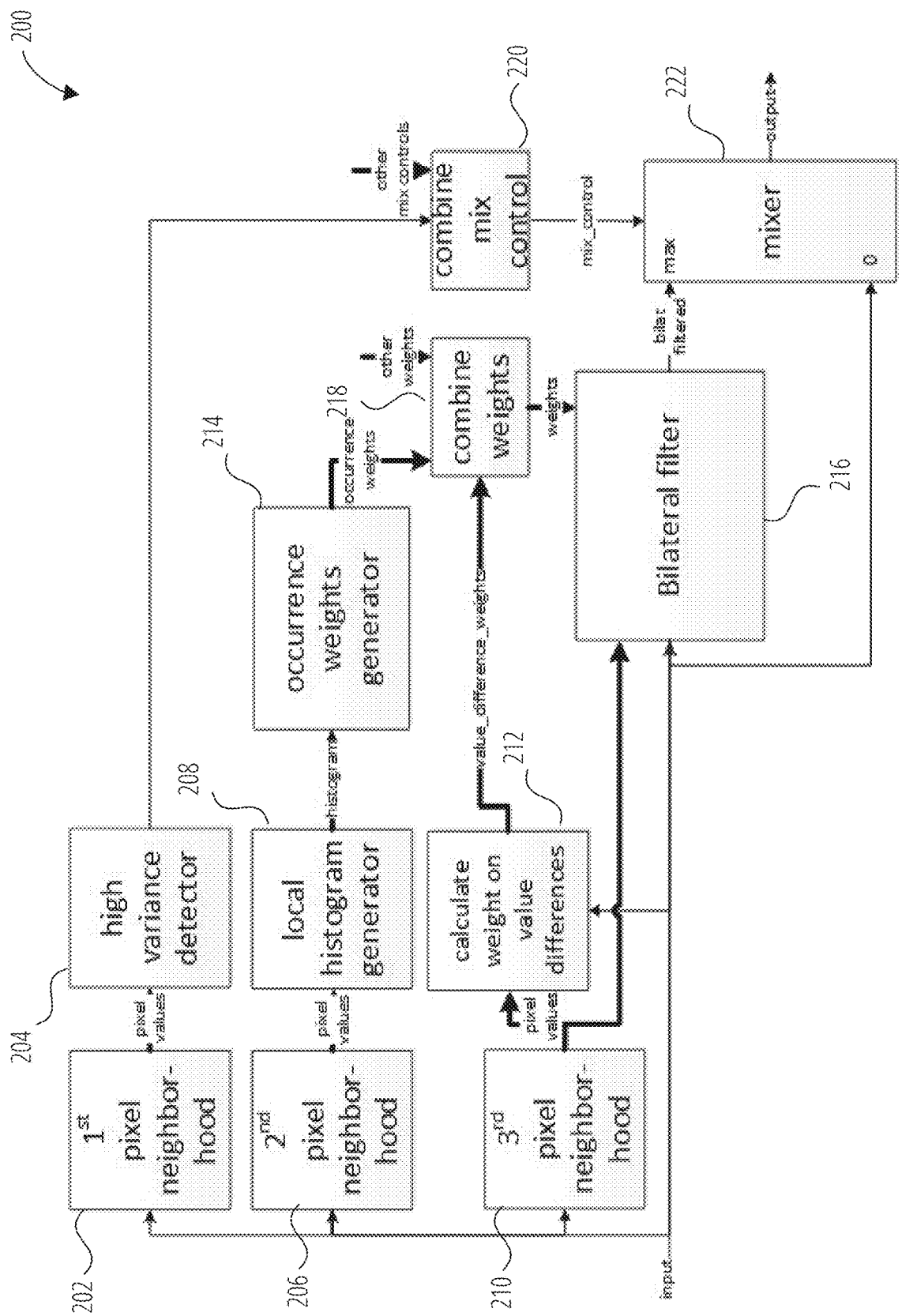
FIG. 2 illustrates a system in accordance with one embodiment.

FIG. 2 illustrates a system 200 in accordance with one embodiment. In the series of weights (one for each pixel in the neighborhood) there is here at least one related to the 'occurrence weights' that are derived from the local histogram.

The new method enables strong bilateral filtering and the end-result needs to be constrained to the conditions in which it is really desired, to prevent distortions in other image areas. Especially low-level detail, in areas without strong variance present, should not get filtered. Also slopes in the image should be left unfiltered, to prevent distortion on them. A side-effect of the bilateral filter is also that (parts of edges) can get steepened. Unless that is a wanted side-effect, the bilateral effect should be limited in the immediate edge area. These filtering-limiting effects can be created via either the 'other mix controls' or by the 'other weights'.

Neighborhood pixel values from first pixel neighborhood 202, second pixel neighborhood 206 and third pixel neighborhood 210 are input into a high variance detector 204, local histogram generator 208, and value difference weight calculator 212 respectively. An occurrence weights generator 214 generates the occurrence weights based on histogram from the local histogram generator 208 that is fed into the weight combiner 218 optionally along with other weights (e.g., in this and other examples herein may include almost anything that a designer may see as also beneficial, such as a lower weight on pixels that are on an edge and higher weight on pixels in flat areas). The combined weights are fed into the bilateral filter 216 which filters pixels (e.g., from the third pixel neighborhood 210). A combine mix control 220, based on input from the high variance detector 204 and optionally, other mix controls, mixes the filtered pixel values with original pixels and then outputs the pixels.

An example for the 'other weights/controls' would be a texture metric: If in an area similar texture is found as beyond the area in which the filtering is active, a texture weight or control could limit the filtering, so that the texture remains preserved even in the neighborhood of larger signal transients.

Such a detector detects similarities in amplitude and frequency contents and directionalities between the direct environment and a further environment. The more these sub-metrices are (simultaneously) alike, the less filtering should result.

Detection can also be 'on an edge' as edges may get distorted by the filtering. It may look like that the 'high-variance detector' already takes that into account, but that one has a wide pixel neighborhood, so telling 'there is a significant transient in the neighborhood of about a block-sized area'. And that detection works toward more filtering, not towards limiting the filtering.

What an 'on-an-edge' or 'edge-detection' metric would do is tell that the current pixel is actually part of an edge itself. So the aperture of such metric would be rather small, like 3×3 pixels.

Such an edge-detector may comprise the sum of absolute horizontal+absolute vertical Sobel filtered version of the input+ranging and clipping.

V_Sobel is typically: $\{\{-1, -1, -1\}, \{0, 0, 0\}, \{1, 1, 1\}\}$
H_Sobel is typically: $\{\{-1, 0, 1\}, \{-1, 0, 1\}, \{-1, 0, 1\}\}$ In an example, the components of the system 200 can be implemented as follows:

high variance detector 204: output=(squared sum of (pixel value−average pixel value))/constant, with summation over the pixel environment; output clipped to a desired maximum level weight combiner 218: output=multiplication of each weight input PLUS ranging and clipping combine mix control 220: output=multiplication of each mix input PLUS ranging and clipping value difference weight calculator 212: output=CONST1−CONST2*ABS (central pixel value−neighbor pixel value) PLUS ranging and clipping bilateral filter 216: output=SUM (weight*neighbor_pixel_value)/SUM(weight) with summation over the pixel environment mixer 222: output=k*input1+(1−k)*input 2

Figure 3:
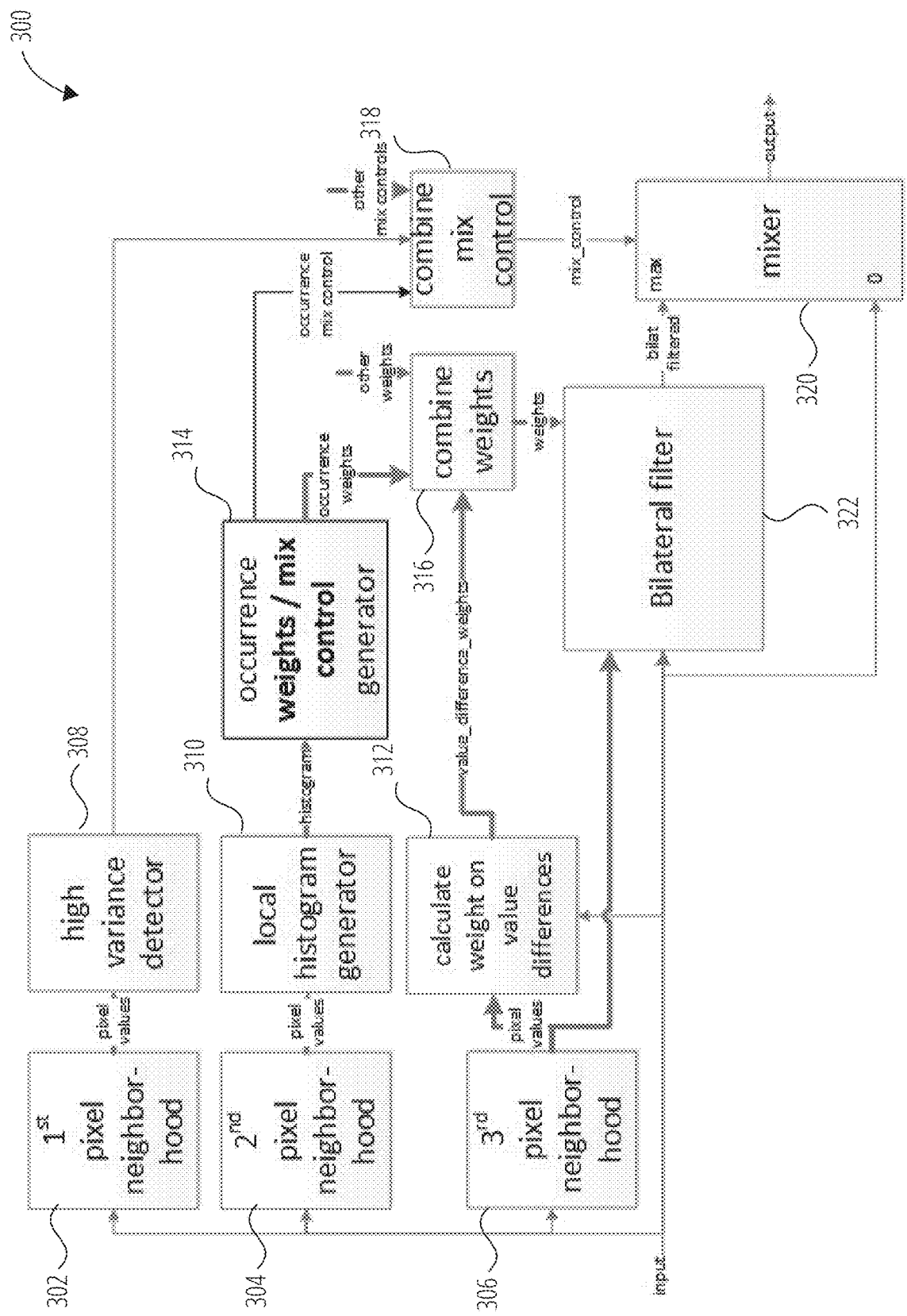
FIG. 3 illustrates a system in accordance with one embodiment.

FIG. 3 illustrates a system 300 in accordance with one embodiment. It may be advantageous to also include also an overall filter strength control derived from the histogram density of the central pixel as an extra. A high variance detector 308, a local histogram generator 310 and a value difference weight calculator 312 received pixel values from, respectively, first pixel neighborhood 302, second pixel neighborhood 304 and third pixel neighborhood 306. The local histogram generator 310 generates a histogram, which is then fed to the occurrence weights/mix control generator 314, which generates both occurrence weights and mix control. The weight combiner 316 combines the occurrence weights and optionally other weights, which are fed into a bilateral filter 322 which filters input pixel values. The filtered pixels are then into a mixer 320, which mixed filtered and unfiltered pixel values per the combine mix control 318.

This mix-control needs also be derived from the (modified) histogram data. A thresholded and furthermore clipped version of the occurrence-density weight is suitable for the mix-control signal.

Figure 4:
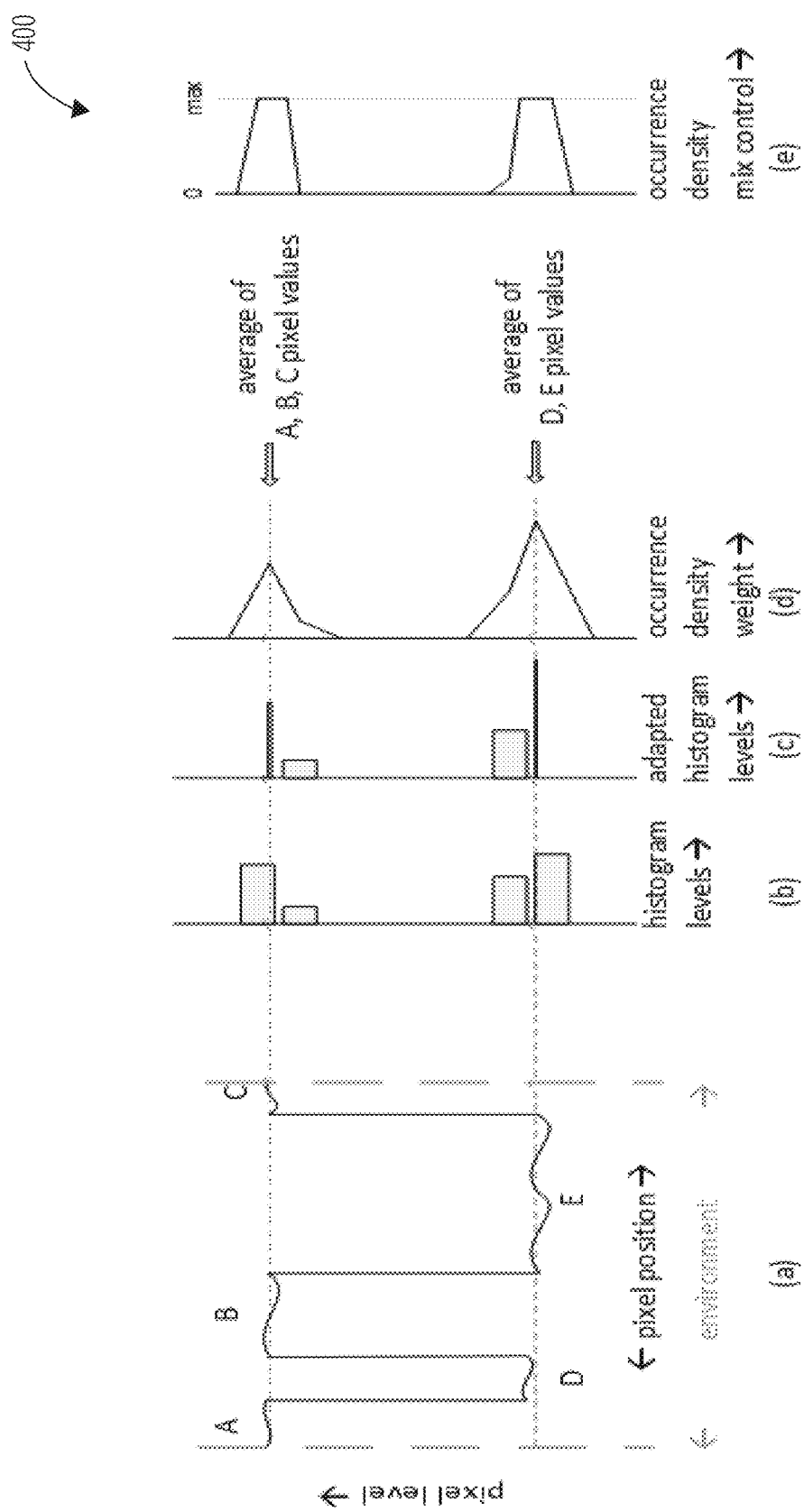
FIG. 4 illustrates signal behavior of the embodiment of FIG. 3.

FIG. 4 illustrates signal behavior 400 of the embodiment of FIG. 3. According the example OF system 300, the part (e) in FIG. 4 shows the appropriate form for the occurrence-density mix-control.

Figure 5:
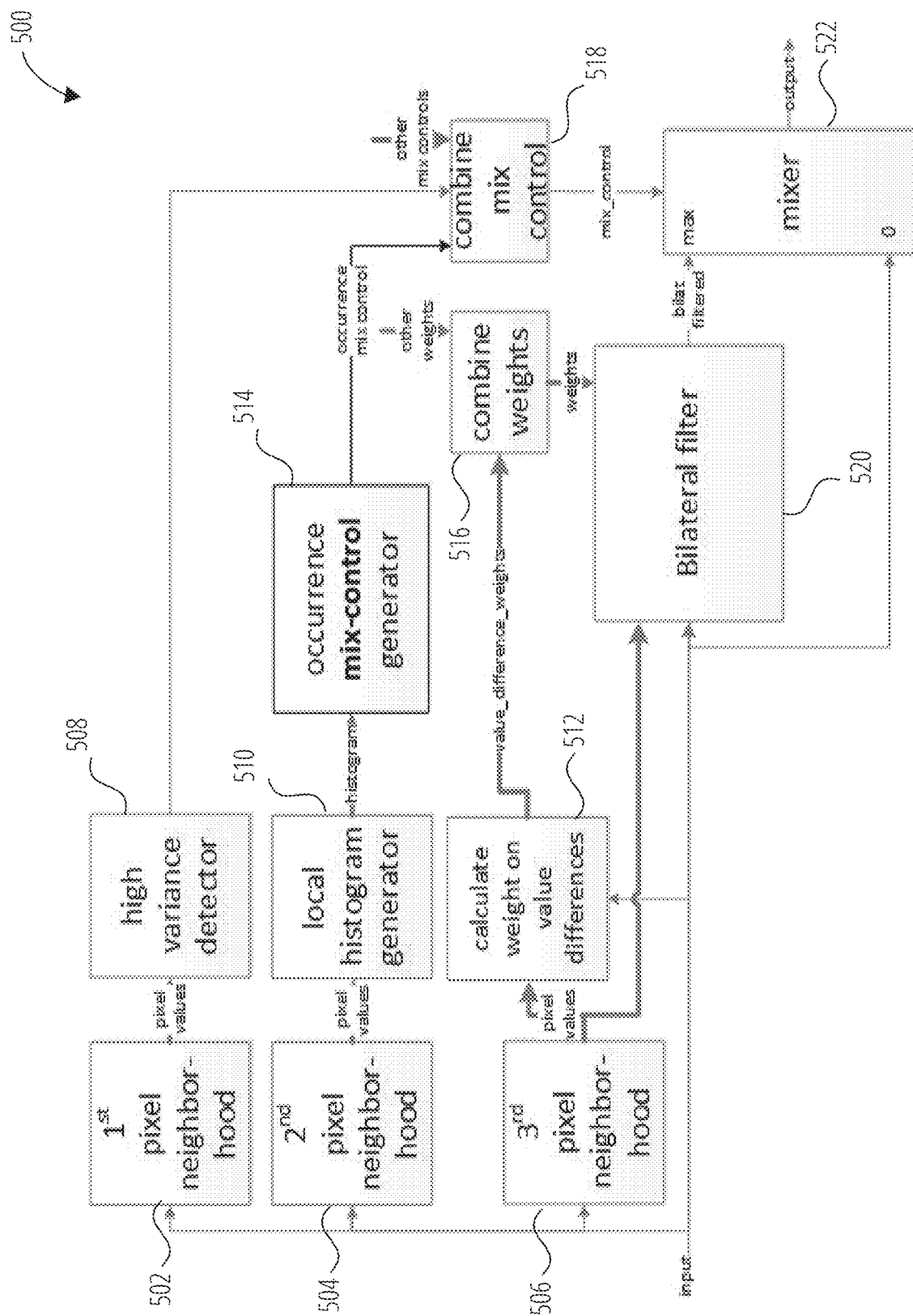
FIG. 5 illustrates a system in accordance with one embodiment.

FIG. 5 illustrates a system 500 in accordance with one embodiment. The high variance detector 508, local histogram generator 510 and value difference weight calculator 512 received pixel input values from first pixel neighborhood 502, second pixel neighborhood 504, and third pixel neighborhood 506, respectively. The local histogram generator 510 generates a histogram, which is fed to the occurrence mix-control generator 514 that generates occurrence mix control for the combine mix control 518 but not occurrence weights for the weight combiner 516. The value difference weight calculator 512 generates value difference weights, which is used by the weight combiner 516 to generate weights for the bilateral filter 520, which filters input pixel values. These filtered pixel values are then fed to the mixers 522, which is mixes the filtered pixels with unfiltered pixels according to the combine mix control 518. The mixed pixels are then output.

The system 500 may be somewhat less performing, yet clearly cheaper option as the bilateral filter 520 as it uses only a neighbor-dependent weight based on (at least) the value difference and an overall filter strength control derived from the histogram density of the central pixel. Here only one 'occurrence mix control' signal needs to be generated from the histogram.

Figure 6:
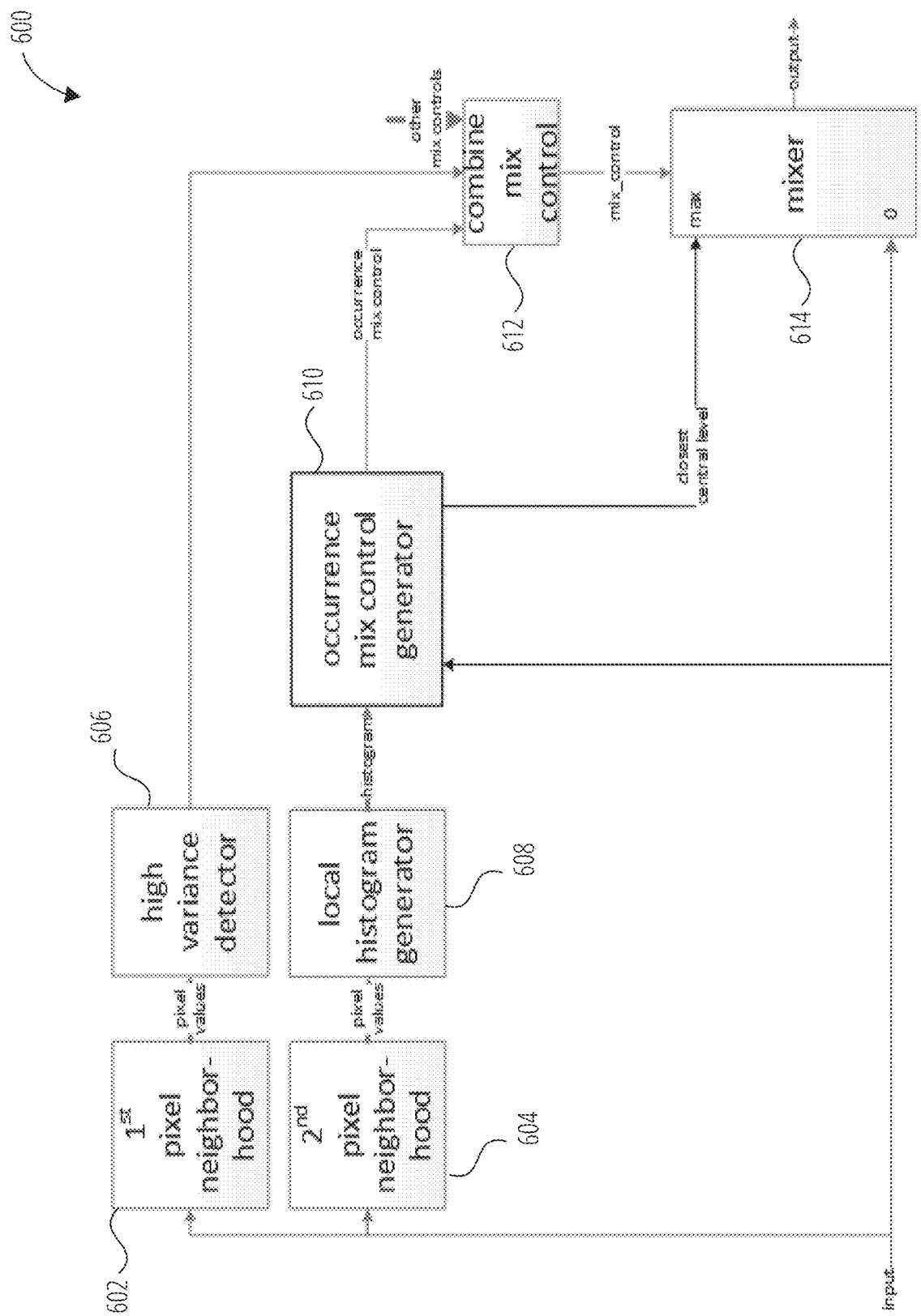
FIG. 6 illustrates a system in accordance with one embodiment.

FIG. 6 illustrates a system 600 in accordance with one embodiment. System 600 is a lower cost variant of the system 500. In this variant, the closest central level needs to be determined. It can be set equal to the local top of the occurrence-density weight (that as such is not used here to drive a bilateral filter weight, as the bilateral filter is missing). The system 600 comprises a high variance detector 606 and a local histogram generator 608 that receive pixel values from first pixel neighborhood 602 and second pixel neighborhood 604, respectively. The local histogram generator 608 generates a histogram, which is fed to the occurrence mix control generator 610, which generates occurrence mix control signals for the combine mix control 612 and closest central level for the mixer 614. The mixer 614 then mixes pixel values per the combine mix control 612 and the closest central level and outputs them.

Figure 7:
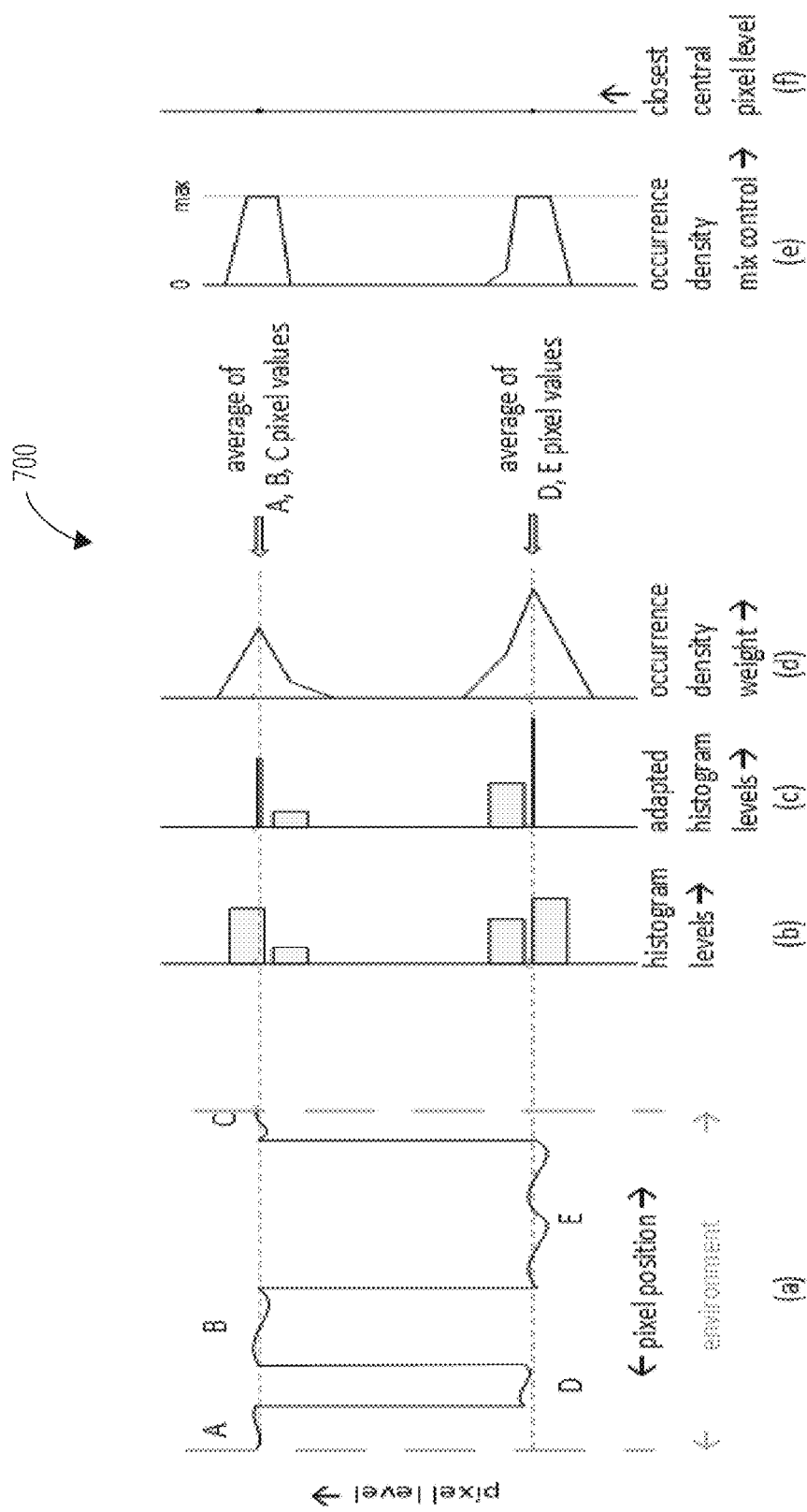
FIG. 7 illustrates signal behavior of the embodiment of FIG. 6.
Figure 8:
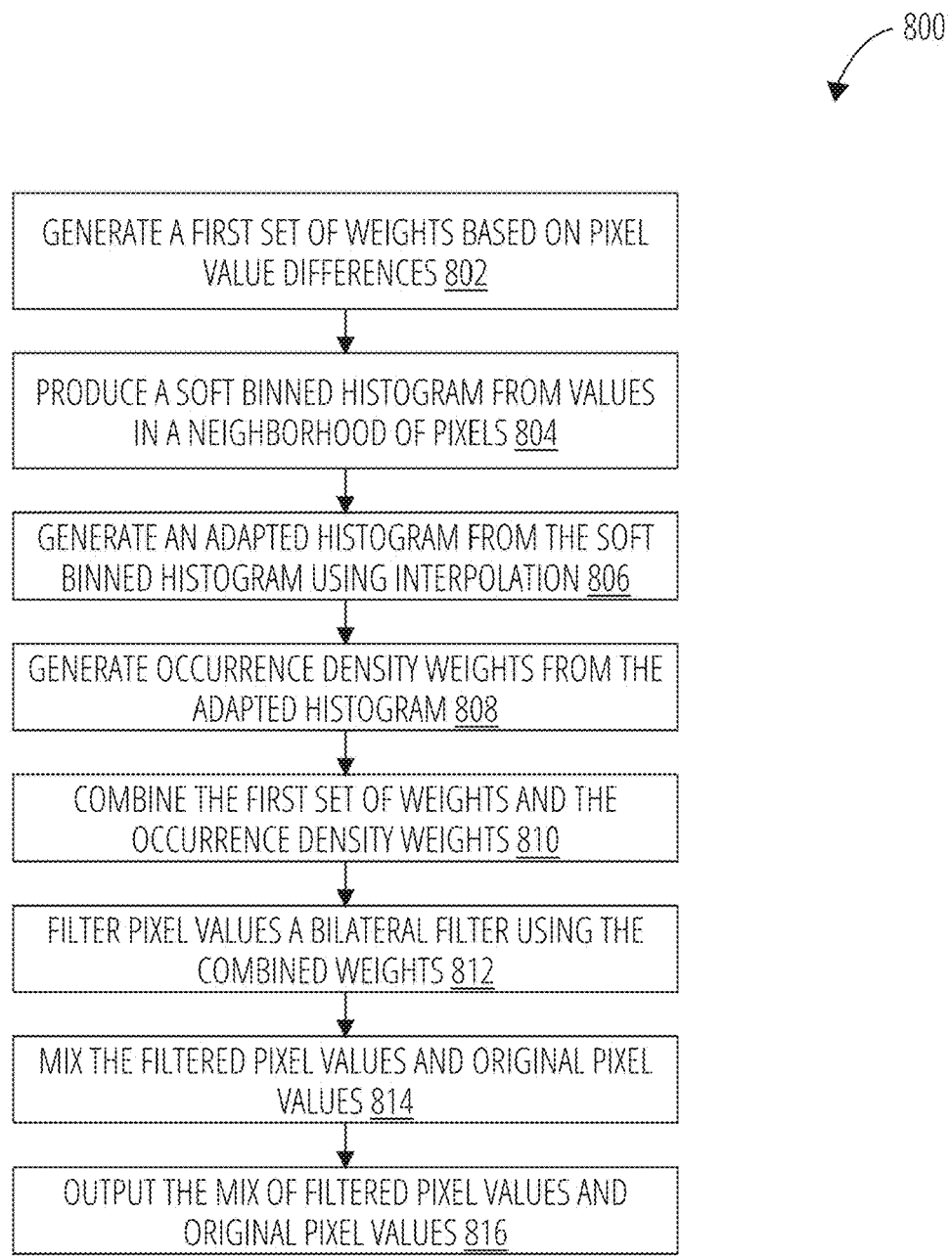
FIG. 8 illustrates a method executed by the system of FIG. 2.

FIG. 7 illustrates signal behavior 700 of the embodiment of FIG. 6. According the previously described example of system 600, (f) in FIG. 7 shows the closest central pixel levels, that are to be used in the enveloping density mix-control pixel value ranges FIG. 8 illustrates a method executed by the system of FIG. 2. In block 802, the system 200 generates a first set of weights based on pixel value differences. In block 804, the system 200 produces a soft binned histogram from values in a neighborhood of pixels. In block 806, the system 200 generates an adapted histogram from the soft binned histogram using interpolation. In block 808, the system 200 generates occurrence density weights from the adapted histogram. In block 810, the system 200 combines the first set of weights and the occurrence density weights. In block 812, the system 200 filters pixel values a bilateral filter using the combined weights. In block 814, the system 200 mixes the filtered pixel values and original pixel values. In block 816, the system 200 outputs the mix of filtered pixel values and original pixel values.

Figure 9:
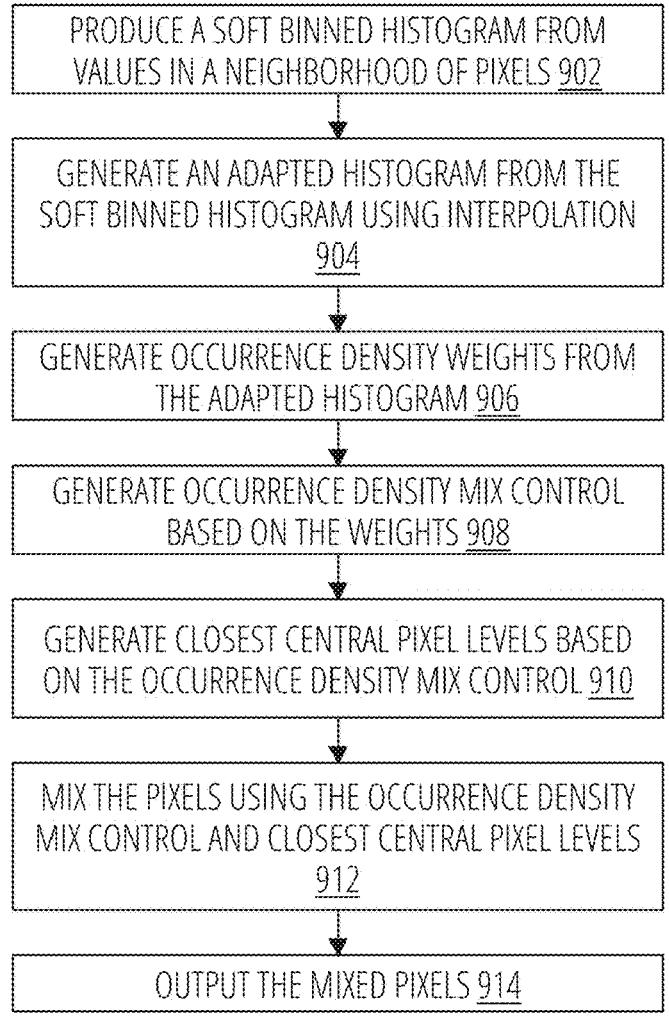
FIG. 9 illustrates a method executed by the system of FIG. 7.

FIG. 9 illustrates a method executed by the system of FIG. 6. In block 902, the system 600 produces a soft binned histogram from values in a neighborhood of pixels. In block 904, the system 600 generates an adapted histogram from the soft binned histogram using interpolation. In block 906, the system 600 generates occurrence density weights from the adapted histogram. In block 908, the system 600 generates occurrence density mix control based on the weights. In block 910, the system 600 generates closest central pixel levels based on the occurrence density mix control. In block 912, the system 600 mixes the pixels using the occurrence density mix control and closest central pixel levels. In block 914, the system 600 outputs the mixed pixels.

The following examples describe various embodiments of methods, machine-readable media, and systems (e.g., machines, devices, or other apparatus) discussed herein.

1. A method to reduce compression artefacts, comprising:
generating a first set of weights based on pixel value differences;
producing a soft binned histogram from values in a neighborhood of pixels;
generating an adapted histogram from the soft binned histogram using interpolation;
generating occurrence density weights from the adapted histogram;
combining the first set of weights and the occurrence density weights;
filtering pixel values a bilateral filter using the combined weights;
mixing the filtered pixel values and original pixel values; and
outputting the mix of filtered pixel values and original pixel values.

2. The method of example 1, further comprising deriving mix control from the adapted histogram and generating a mix control signal specifying a weighted average between filtered and original pixel values to output.

3. The method of any of the preceding examples, wherein the soft binned histogram has 32 or 64 bins.

4. The method of any of the preceding examples, further comprising combining the first set of weights and the occurrence density weights with other weights.

5. The method of any of the preceding examples, wherein the other weights include a lower weight on pixels that are on an edge relative to pixels in flat areas.

6. The method of any of the preceding examples, further comprising detecting a high variance in pixel values and wherein the mixing is based on the detection.

7. The method of any of the preceding examples, wherein the mixing is further based on other mix controls.

8. The method of any of the preceding examples, wherein the other mix controls include an edge detection metric.

9. A method to reduce compression artefacts, comprising:
producing a soft binned histogram from values in a neighborhood of pixels,
generating an adapted histogram from the soft binned histogram using interpolation;
generating occurrence density weights from the adapted histogram;
generating occurrence density mix control based on the weights;
generating closest central pixel levels based on the occurrence density mix control;
mixing the pixels using the occurrence density mix control and closest central pixel levels; and
outputting the mixed pixels.

10. The method of any of the preceding examples, further comprising generating pixel value difference weights and filtering the pixels before the mixing according to the weights with a bilateral filter.

11. The method of any of the preceding examples, further comprising combining the generated pixel value difference weights with other weights and filtering using the combined weights.

12. The method of any of the preceding examples, wherein the other weights include a lower weight on pixels that are on an edge relative to pixels in flat areas.

13. The method of any of the preceding examples, further comprising detecting a high variance in pixel values and wherein the mixing is based on the detection.

14. The method of any of the preceding examples, wherein the mixing is further based on other mix controls.

15. The method of any of the preceding examples, wherein the other mix controls include an edge detection metric.

16. A system for reducing compression artefacts, comprising:
a value different weight calculator configured to generate a first set of weights based on pixel value differences;
a local histogram generator configured to produce a soft binned histogram from values in a neighborhood of pixels and an adapted histogram from the soft binned histogram using interpolation;
an occurrence weights generator configured to generate occurrence density weights from the adapted histogram;
a weights combiner configured to combine the first set of weights and the occurrence density weights;
a bilateral filter configured to filter pixel values a bilateral filter using the combined weights;
a mixer configured to mix the filtered pixel values and original pixel values; and
an output configured to output the mix of filtered pixel values and original pixel values.

17. The system of example 16, wherein the weight combiner is further configured to combine the first set of weights and the occurrence density weights with other weights.

18. The system of any of the preceding examples, wherein the other weights include a lower weight on pixels that are on an edge relative to pixels in flat areas.

19. The system of any of the preceding examples, wherein the soft binned histogram has 32 or 64 bins.

20. The system of any of the preceding examples, wherein the mixing includes other mix controls including an edge detection metric.

What is claimed is:

1. A method to reduce compression artefacts, comprising:
receiving an image;
selecting a neighborhood of pixels around each central pixel;
computing differences between central pixel value versus respective neighbor pixel value;
generating a first set of weights based on the pixel value differences;
producing a soft binned histogram from values in a neighborhood of pixels;
generating an adapted histogram from the soft binned histogram using interpolation;
generating occurrence density weights from the adapted histogram;
combining the first set of weights and the occurrence density weights;
filtering pixel values by a bilateral filter using the combined weights;
mixing the filtered pixel values and pixel values from the pixel neighborhood; and
outputting the mix of filtered pixel values and pixel values from the pixel neighborhood.

2. The method of claim 1, further comprising deriving mix control from the adapted histogram and generating a mix control signal specifying a weighted average between filtered and pixel values from the pixel neighborhood to output.

3. The method of claim 1, wherein the soft binned histogram has 32 or 64 bins.

4. The method of claim 1, further comprising combining the first set of weights and the occurrence density weights with other weights.

5. The method of claim 4, wherein the other weights include a lower weight on pixels that are on an edge relative to pixels in flat areas.

6. The method of claim 1, further comprising detecting a high variance in pixel values and wherein the mixing is based on the detection.

7. The method of claim 6, wherein the mixing is further based on other mix controls.

8. The method of claim 7, wherein the other mix controls include an edge detection metric.

9. A method to reduce compression artefacts, comprising:
receiving an image;
selecting a neighborhood of pixels around each central pixel;
computing differences between central pixel value versus respective neighbor pixel value;
producing a soft binned histogram from values in a neighborhood of pixels;
generating an adapted histogram from the soft binned histogram using interpolation;
generating occurrence density weights from the adapted histogram;
generating occurrence density mix control based on the weights;
generating closest central pixel levels based on the occurrence density mix control;
mixing the pixels using the occurrence density mix control and closest central pixel levels; and
outputting the mixed pixels.

10. The method of claim 9, further comprising generating pixel value difference weights and filtering the pixels before the mixing according to the weights with a bilateral filter.

11. The method of claim 10, further comprising combining the generated pixel value difference weights with other weights and filtering using the combined weights.

12. The method of claim 11, wherein the other weights include a lower weight on pixels that are on an edge relative to pixels in flat areas.

13. The method of claim 9, further comprising detecting a high variance in pixel values and wherein the mixing is based on the detection.

14. The method of claim 13, wherein the mixing is further based on other mix controls.

15. The method of claim 14, wherein the other mix controls include an edge detection metric.

* * * * *